(12) United States Patent
Matsushima et al.

(10) Patent No.: US 6,937,406 B2
(45) Date of Patent: Aug. 30, 2005

(54) OPTICAL MODULE AND METHOD FOR MANUFACTURING OPTICAL MODULE

(75) Inventors: Naoki Matsushima, Yokohama (JP); Hideo Sotokawa, Yokohama (JP); Hideyuki Kuwano, Yokohama (JP); Yoshiaki Niwa, Yokohama (JP); Keiichi Yamada, Yokohama (JP); Masahiro Hirai, Yokohama (JP); Kazumi Kawamoto, Yokohama (JP); Shohei Hata, Yokohama (JP); Toshiaki Takai, Yokohama (JP)

(73) Assignee: OpNext Japan, Inc., Yokohoma (JP)

( * ) Notice: Subject to any disclaimer, the term of this patent is extended or adjusted under 35 U.S.C. 154(b) by 0 days.

(21) Appl. No.: 10/645,986

(22) Filed: Aug. 22, 2003

(65) Prior Publication Data

US 2004/0240087 A1 Dec. 2, 2004

(30) Foreign Application Priority Data

May 29, 2003 (JP) ........................................ 2003-152007

(51) Int. Cl.[7] ................................................. G02B 7/02
(52) U.S. Cl. ....................................... 359/819; 359/811
(58) Field of Search ................................. 359/811, 819, 359/820

(56) References Cited

U.S. PATENT DOCUMENTS 6,507,446 B2 * 1/2003 Yamashita et al. .......... 359/811
6,512,642 B1 * 1/2003 Bourcier et al. ............. 359/813

FOREIGN PATENT DOCUMENTS

| JP | 2000-121883 | 4/2000 |
| JP | 2001-094191 | 4/2001 |

* cited by examiner

Primary Examiner—Georgia Epps
Assistant Examiner—M. Hasan
(74) Attorney, Agent, or Firm—Townsend and Townsend, and Crew LLP

(57) ABSTRACT

The present invention provides an optical module and a method for manufacturing the optical module, in which a V-shaped or trapezoidal groove having a first slope and a second slope facing to the first slope is formed at the surface of a silicon substrate by anisotropic etching, an adhesive is applied to a portion of at least the second slope in a region except the first slope of the groove, and lens is fixedly put in the groove.

11 Claims, 7 Drawing Sheets

ROOM TEMPERATURE

LOW TEMPERATURE

ROOM TEMPERATURE

LOW TEMPERATURE

LOW TEMPERATURE (REPETITION OF TEMPERATURE CYCLES)

OPTICAL MODULE AND METHOD FOR MANUFACTURING OPTICAL MODULE

BACKGROUND OF THE INVENTION

The present invention relates to optical modules and methods for manufacturing the optical modules and, more particularly, to an optical module in which an optical part such as a lens is fixed to a substrate made of silicon or the like by use of an adhesive, and a method for manufacturing the optical module.

The market scale of products relevant to an optical communication field is growing with advanced information-oriented society. Under this circumstance, a thorough low cost of an optical module is required. Examples of means for achieving the low cost of an optical module include a method disclosed by for example Japanese Patent Laid-open No. 2000-121883, i.e., Prior Art 1. In this method, a substrate made of silicon is used to form a V-shaped groove with a high degree of precision in the surface of the substrate by anisotropic etching, and then, a lens is put into the V-shaped groove by passive alignment. This eliminate the need for carrying out the so-called active alignment in which a semiconductor laser is made to emit light, the position of the lens is adjusted in such a manner as to achieve a greatest optical output, and thereafter, the lens is fixed at the adjusted position. Thus, it is possible to remarkably shorten a lens putting time so as to reduce the cost of the optical module.

On the other hand, Japanese Patent Application Laid-open No. 2001-94191, i.e., Prior Art 2 discloses that an optical part such as a spherical lens is adhesively fixed to a silicon substrate at a V-shaped groove formed therein by anisotropic etching by use of a resin having a glass transition temperature lower than a lowest temperature within the range of operating temperatures of an optical semiconductor element. Furthermore, Prior Art 2 discloses that the optical part is instantaneously fixed onto the substrate by use of an ultraviolet curable type resin such as an epoxy resin.

SUMMARY OF THE INVENTION

In Prior Art 2, the adhesive having a glass transition temperature lower than the operating temperatures of the optical module is used in order to achieve the optical module with a high degree of reliability in which detachment or positional misalignment of the optical part is less liable to occur even if the temperature is varied.

However, such an adhesive does not have a sufficient adhesive strength, and therefore, the lens may be detached.

In view of solving above-described problems, an object of the present invention is to provide an optical module with a high degree of reliability and a method for manufacturing the optical module in which an optical part has a sufficient adhesive strength with respect to a groove formed in a substrate made of silicon or the like, and further, no degradation of an optical output is caused by positional misalignment of the optical part in a temperature cycle test or the like.

In order to achieve the above-described object, according to a first aspect of the present invention, there is provided an optical module comprising: a substrate provided with a groove that is formed in a surface thereof, the groove having a first slope crossing the surface of the substrate at an obtuse angle and a second slope facing to the first slope and crossing the surface of the substrate at an obtuse angle; an optical element mounted on the substrate; and an optical part put in the groove; wherein an adhesive is applied to a portion of at least the second slope except the first slope of the groove so as to fix the optical part in the groove in a structure in which the optical part is in contact with or in the proximity of the first slope and the second slope.

According to a second aspect of the present invention, there is provided an optical module comprising: a silicon substrate provided with a V-shaped or trapezoidal groove that is formed in the surface of the silicon substrate by anisotropic etching, the groove having a first slope and a second slope facing to the first slope and crossing the surface of the substrate at an obtuse angle; an optical element mounted on the silicon substrate; and an optical part put in the groove; wherein an adhesive is applied to a portion of at least the second slope except the first slope of the groove so as to fix the optical part in the groove in a structure in which the optical part is in contact with or in the proximity of the first slope and the second slope.

Preferably, in the present invention, the adhesive may be an ultraviolet ray curable type epoxy resin.

According to a third aspect of the present invention, there is provide a method for manufacturing an optical module, comprising a groove forming step of forming a groove in a surface of a substrate, the groove having a first slope crossing the surface of the substrate at an obtuse angle and a second slope facing to the first slope and crossing the surface of the substrate at an obtuse angle; a optical element mounting step of mounting an optical element on the substrate having the groove formed in the groove forming step; an optical part putting step of applying an adhesive to a portion of at least the second slope except the first slope of the groove formed in the groove forming step and putting the optical part in the groove in such a manner as to be in contact with or in the proximity of the first slope and the second slope; and an adhesive curing step for curing the adhesive applied in the optical part putting step.

According to a fourth aspect of the present invention, there is provided a method for manufacturing an optical module, comprising: a groove forming step of forming a V-shaped or trapezoidal groove in a surface of a silicon substrate by anisotropic etching, the groove having a first slope and a second slope facing to the first slope; an optical element mounting step of mounting an optical element on the surface, of the silicon substrate, having the groove formed in the groove forming step; an optical part mounting step of applying an adhesive to a portion of at least the second slope except the first slope of the groove formed in the groove forming step and putting the optical part in the groove in such a manner as to be in contact with or in the proximity of the first slope and the second slope; and an adhesive curing step of curing the adhesive applied in the optical part putting step.

With the structure according to the present invention as described above, as shown in a schematic view of FIG. 5B, when the temperature inside a module becomes lower than room temperature, a state of which is shown in a schematic view of FIG. 5A, stress 122 caused by a difference in thermal expansion coefficient between a silicon substrate 1 and a lens 2 can be avoided by slight enlargement of a clearance 102 between a first slope 41 without any adhesive corresponding to the adhesive 3 and the lens 2. The stress 122 is caused in the case shown in FIGS. 7A to 7C. As a consequence, even if a temperature cycle test or the like is carried out, no positional misalignment, detachment or the like of the lens 2 occurs, thereby achieving an optical module with a high degree of reliability without any degradation of an optical output.

In other words, according to the present invention, the stress caused by the thermal expansion coefficient between members can be avoided from being caused at a connecting portion between the lens and the silicon when the temperature is varied even by use of an adhesive having a sufficient adhesive strength. Consequently, no positional misalignment, detachment or the like of the lens is caused in the temperature cycle test or the like, thus producing an effect of achievement of an optical module with a high degree of reliability without any degradation of an optical output.

BRIEF DESCRIPTION OF THE DRAWINGS

FIGS. 1A and 1B are perspective views showing an optical module in a preferred embodiment according to the present invention, wherein FIG. 1A is a view showing a state before a lens is put in and FIG. 1B is a view showing a completed state after the lens has been put in;

FIGS. 2A and 2B are views showing the optical module in the preferred embodiment according to the present invention, wherein FIG. 2A is a top view and FIG. 2B is a cross-sectional view taken along a direction perpendicular to an optical axis;

FIGS. 5A and 5B are schematic views showing a stress avoiding mechanism according to the present invention, in which FIG. 5A is a view at room temperature and FIG. 5B is a view at a low temperature;

FIGS. 6A and 6B are perspective views showing an optical module in a comparative example, in which FIG. 6A is a view showing a state before a lens is put in and FIG. 6B is a view showing a completed state after the lens has been put in;

FIGS. 7A to 7C are schematic views showing a stress generation mechanism in the comparative example, in which FIG. 7A is a view at room temperature, FIG. 7B is a view at a low temperature and FIG. 7C is a view at a low temperature (repetition of temperature cycles)

DETAILED DESCRIPTION OF THE PREFERRED EMBODIMENT

An optical module with a high degree of reliability according to a preferred embodiment of the present invention will be described below in reference to the accompanying drawings.

Figure 1A:
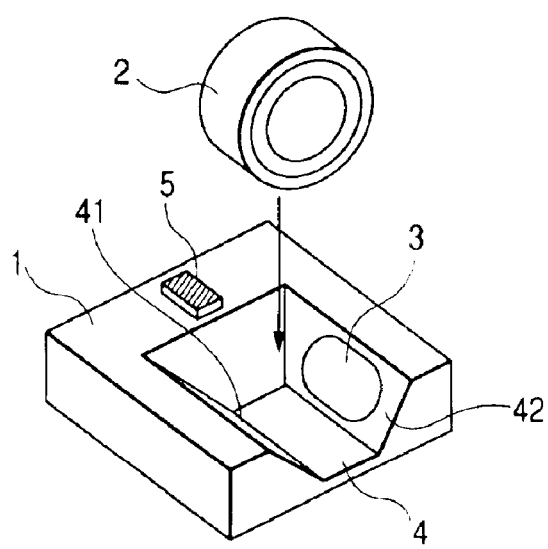
Figure 1B:
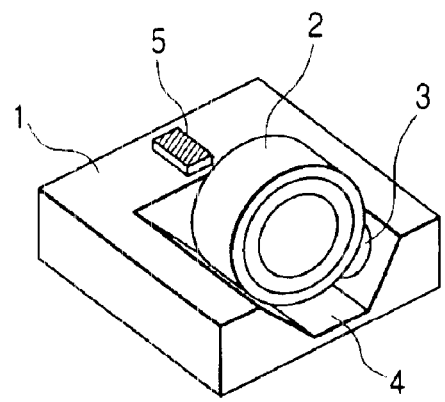

FIGS. 1A and 1B show an optical module in a preferred embodiment according to the present invention, wherein FIG. 1A illustrates a state before a lens is put in and FIG. 1B illustrates a completed state after the lens has been put in. A substrate 1 is made of silicon on which a lens 2 and an optical element 5 are mounted. The substrate 1 is provided with a trapezoidal groove 4 formed with a high degree of dimensional accuracy by anisotropic etching. The groove 4 may be formed in a V-shape by etching the entire bottom surface of a trapezoid. The groove 4 includes a first slope 41, which crosses the surface of the substrate 1 at an obtuse angle, and a second slope 42, which faces to the first slope 41 and crosses the surface of the substrate 1 at an obtuse angle. Wiring and a solder connection electrode are formed on the substrate 1, although not shown, and further, a semiconductor laser 5 is fixed at a proper position on the substrate 1 by solder welding with Au—Sn or the like.

The lens 2 is disposed inside the V-shaped groove 4 is put the lens 2. The present uses a cylinder-shaped spherical lens integrated with a metallic holder as the lens 2. For the kind of lens, other optical parts other than the above-described lens may be used. Specifically, it is possible to use a cylinder-shaped lens formed of only glass or a spherical lens.

A UV curable type epoxy based adhesive is used for connecting the groove 4 formed in the silicon substrate 1 and the lens 2. In the present embodiment, a UV curable type epoxy based adhesive WR 8774 manufactured by Kyoritsu Chemical & Co., Ltd. is used. The adhesive may be adhesives other than the above-described adhesive as long as the adhesives meet conditions, such as high adhesive strength (specifically, it is desirable that an adhesive should have 1 N or more of shearing strength) and resistance to temperatures in a manufacturing process after the lens is put in. As shown in FIG. 1B, when the lens 2 is put in the groove 4, the lens 2 is arranged in contact with or in the proximity of the first slope 41 and the second slope 42 facing to the first slope 41 of the groove 4. The adhesive 3 is applied onto a portion of only the second slope 42. A condition is that the adhesive 3 is applied onto a portion of at least the second slope 42 in the surfaces except the first slope 41 in contact with or in the proximity of the lens inside the groove 4. This means that the adhesive 3 may be applied onto not only a portion of the second slope 42 but also a portion of the bottom surface of the trapezoidal groove 4.

Figure 2A:
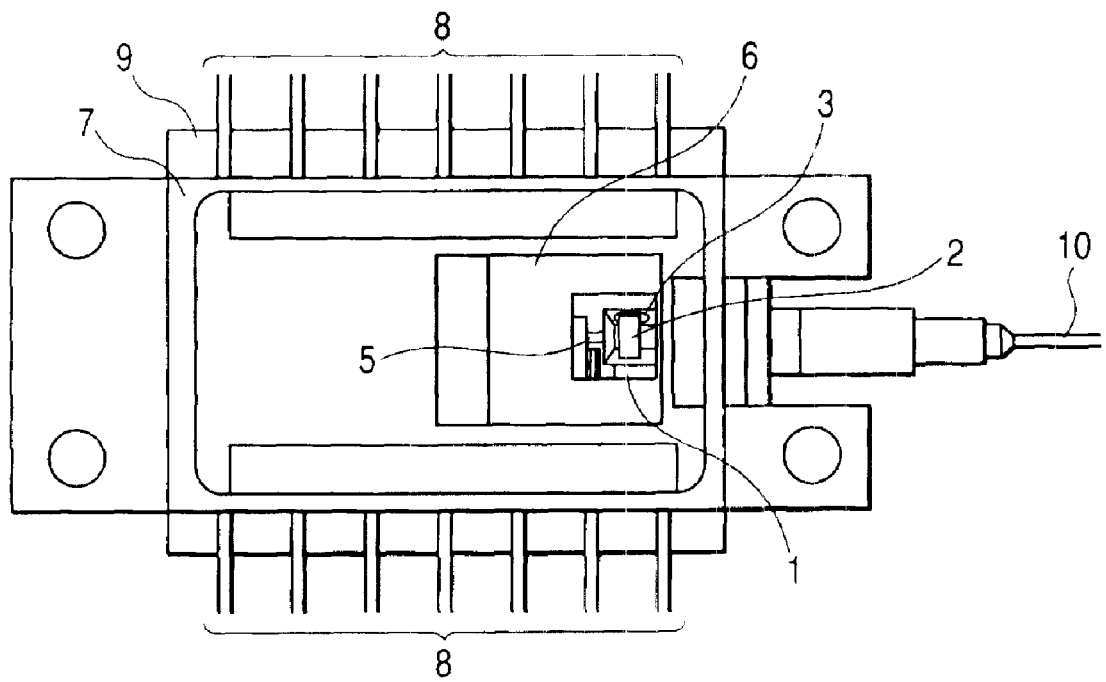
Figure 2B:
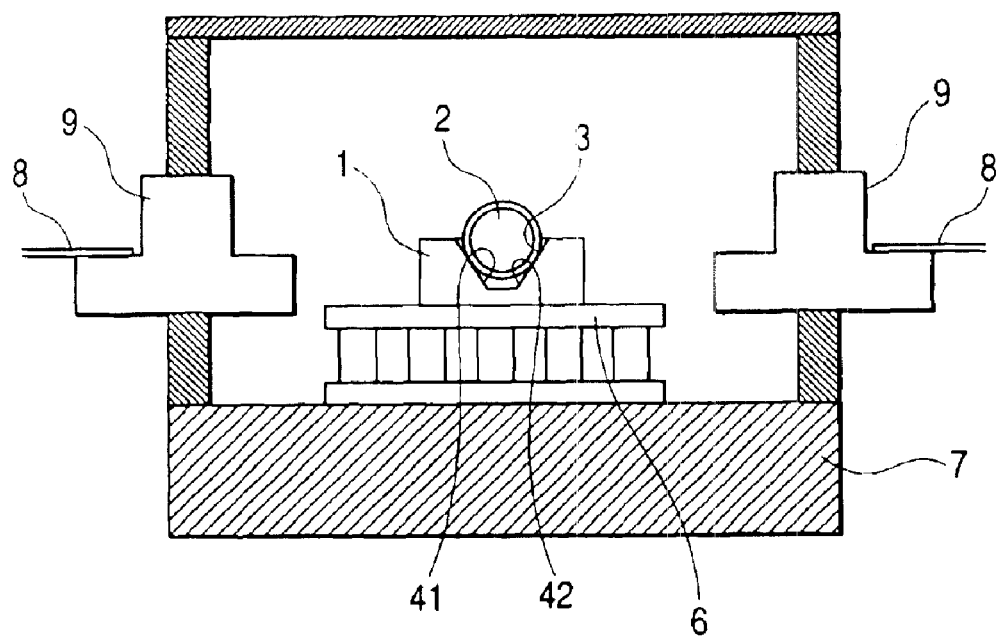

FIGS. 2A and 2B show states in which the optical module shown in FIGS. 1A and 1B according to the invention is incorporated in a package in the preferred embodiment. FIG. 2A is a top view and FIG. 2B is a cross-sectional view taken along a direction perpendicular to an optical axis. The silicon substrate 1 on which the semiconductor laser 5 and the lens 2 are mounted is packed in a module package via a Peltier cooler or stem or directly. The present embodiment is configured such that the silicon substrate 1 on which the semiconductor laser 5 and the lens 2 are mounted is secured to a module package 7 via a Peltier cooler 6 by soldering or the like. An electric signal to be input into the semiconductor laser, a power source of the Peltier cooler, or the like is input from a lead wire 8, and then, is introduced into the module package 7 via a wiring formed on a feed through 9, thus being transmitted to each of component parts by the use of a wiring board or bonding wire, although not shown. Light emitted from the semiconductor laser 5 is focused by the lens 2, then coupled with an optical fiber 10, and thus, output to the outside of the module.

Next, a description will be made of a method for manufacturing the optical module according to the embodiment of the present invention in reference to FIGS. 3A to 3F.

Figure 3A:
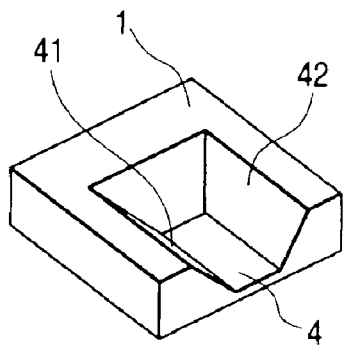
FIGS. 3A to 3F are perspective views showing a method for manufacturing the optical module in the preferred embodiment according to the present invention.

First, as shown in FIG. 3A, there is prepared the silicon substrate 1 having the groove 4 formed at the surface thereof by anisotropic etching. The use of the silicon substrate with the substrate surface being a [100] face makes it possible to form the groove having the first slope 41, which crosses the substrate surface at an obtuse angle (i.e., at an angle of 125°), and the second slope 42, which faces the first slope 41 and crosses the substrate surface at an obtuse angle (i.e., at an angle of 125°) in the same manner, as shown in FIG. 3A. The groove may be formed into a trapezoid having a flat bottom surface, as shown in FIG. 3A, or may be formed into a V-shape by completely etching the flat bottom surface. Incidentally, in the case where the outer diameter of the lens 2 is set to about 1.5 mmφ, the depth of the trapezoidal groove becomes about 0.8 mm and the width of the inlet of the groove becomes about 1.8 mm.

Figure 3B:
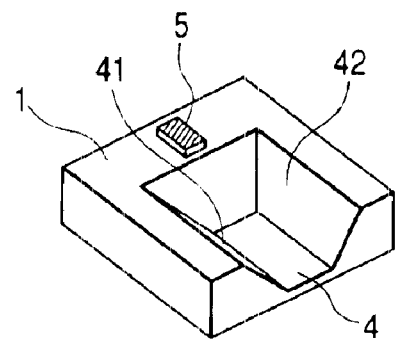

Subsequently, as shown in FIG. 3B, the semiconductor laser 5 is mounted on an electrode, not shown, formed on the surface of the silicon substrate 1 by Au—Sn soldering. The semiconductor laser 5 is mounted such that emission light is oriented in a direction in which the groove 4 is formed, that is, in parallel to the first slope 41 and the second slope 42.

Thereafter, the lens 2 is put in, as explained below. The lens 2 is arranged at a position on which the light emitted from the semiconductor laser 5 is focused. More specifically, the lens 2 is arranged such that its optical axis becomes parallel to the first slope 41 and the second slope 42, that is, to the light emitted from the semiconductor laser 5. If the lens 2 is put in the groove 4 in the above-described orientation, the lens 2 is brought into contact with or in the proximity of the first slope 41 and the second slope 42 in the case where the lens 2 is formed into a general shape such as a cylinder or sphere.

Figure 3C:
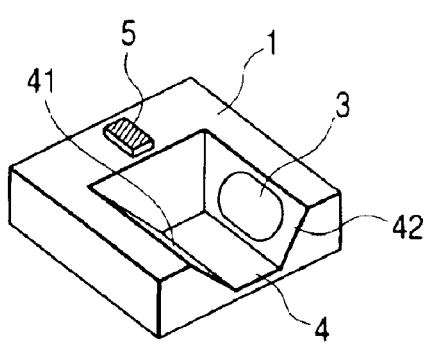
Figure 3D:
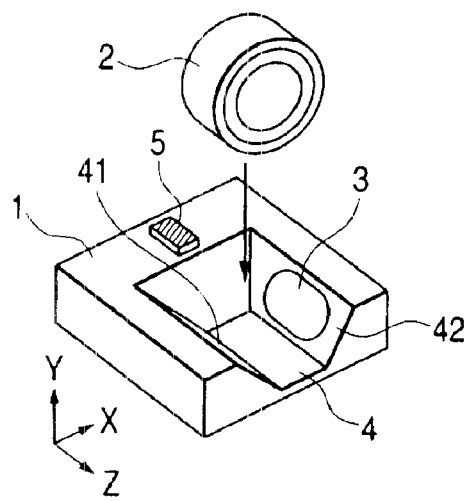
Figure 5A:
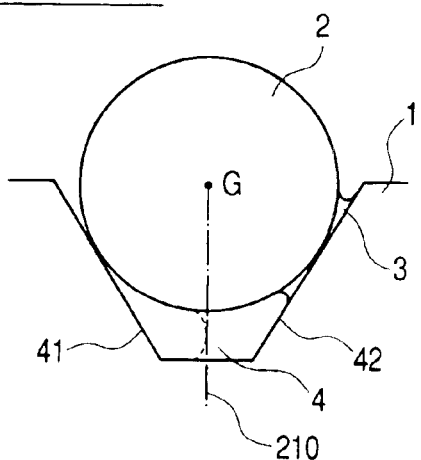
Figure 7A:
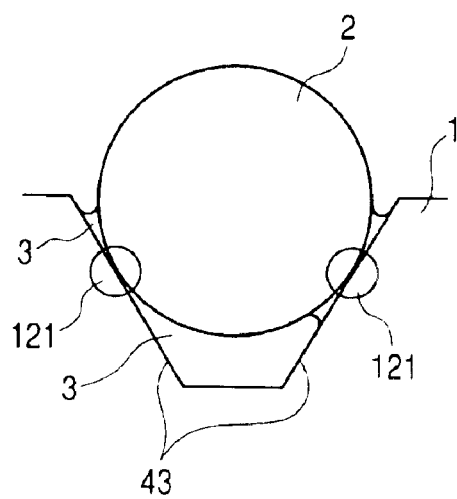
Figure 7B:
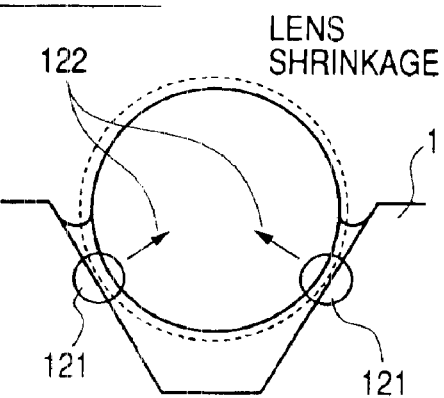
Figure 7C:
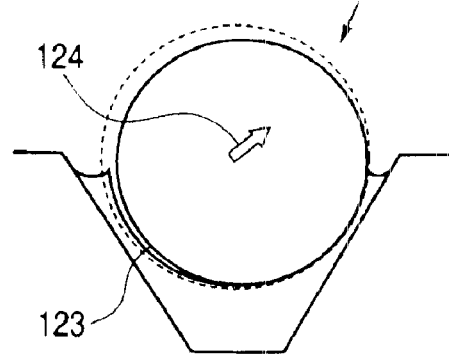

Accordingly, as shown in FIG. 3C, the adhesive 3 is first applied onto a portion of only the second slope 42 of the groove 4. The UV curable type epoxy adhesive WR 8774 manufactured by Kyoritsu Chemical & Co., Ltd. is used as the adhesive 3. The adhesive 3 is applied such that the adhesive 3 can be applied to a portion of only the second slope 42 in a fine quantity by using a dispenser ML-808EX manufactured by Musashi Engineering, Inc. As a result, the adhesive 3 is applied to only a portion of the second slope 42. There exists a condition that the portion to which the adhesive 3 is applied is a portion of at least the second slope 42 except the first slope 41 in contact with or in the proximity of the lens put in the groove 4. In other words, although an applied region may extend down to the bottom surface of the trapezoidal groove 4 beyond the second slope 42, the adhesive 3 need be applied in such a manner as not to extend beyond a vertical line 210 drawn from the center G of gravity of the lens at the lower end on the outer periphery of the lens 2, as indicated by a chain line, as shown in FIG. 5A, when the lens 2 is descended as shown in FIG. 3D. This intends to apply no tension between the lens 2 and the adhesive, as possible, as shown in FIG. 7C in temperature cycles after the adhesive 3 is cured. In this manner, the adhesive 3 is supplied and applied in such a manner as to be located at a portion of only the second slope 42 in a fine quantity irrespective of the trapezoidal groove 4 or the V-shaped groove, so that the adhesive 3 can be applied in such a manner as not to extend beyond the vertical line 210 drawn from the center G of gravity of the lens with respect to the outer periphery of the lens.

Next, as shown in FIG. 3D, the lens 2 is put in the groove 4. The lens 2 is arranged in the orientation as described above. Assuming that an X axis represents a direction perpendicular to the optical axis of the semiconductor laser 5 and parallel to the surface of the substrate, a Y axis represents a direction perpendicular to both of the optical axis and the surface of the substrate and a Z axis represents the direction of the optical axis, the X-Y coordinates of the lens 2 are determined automatically when the lens 2 is put in the groove 4. The groove 4 has a dimensional accuracy of several ìm, and further, the outer diameter of the lens 2 has a dimensional error of about 10 ìm. Therefore, it is possible to secure about several tens ìm of a relative positional accuracy between the semiconductor laser 5 and the lens 2 with simple packaging.

Figure 3E:
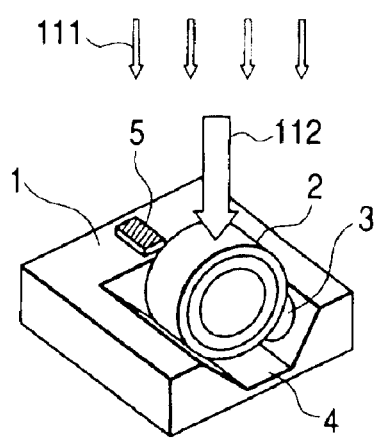

Thereafter, as shown in FIG. 3E, the adhesive is cured. First, the curing is performed by the irradiation of ultraviolet rays. An ultra high-pressure mercury-vapor lamp is used as a light source. The irradiation conditions of ultraviolet rays 111 are set to 400 mW for 53 seconds. During the irradiation, a load 112 of 100 gf is exerted on the vertex of the lens 2 in a direction of the normal to the surface of the silicon substrate 1. After the completion of the irradiation of the ultraviolet rays, the adhesive is cured by heating. At this time, the temperature is set to 160° C., a holding time is set to 2 minutes, and the load is kept at 100 gf.

Figure 3F:
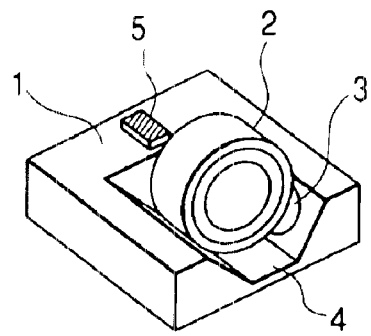

Through the above-described processes, as shown in FIG. 3F, the optical module according to the present invention is completed. The optical module obtained, as described above, cannot be degraded in optical output even in a temperature cycle test or the like. Consequently, it is possible to provide the optical module with a high degree of reliability and the method for manufacturing the optical module.

Figure 4:
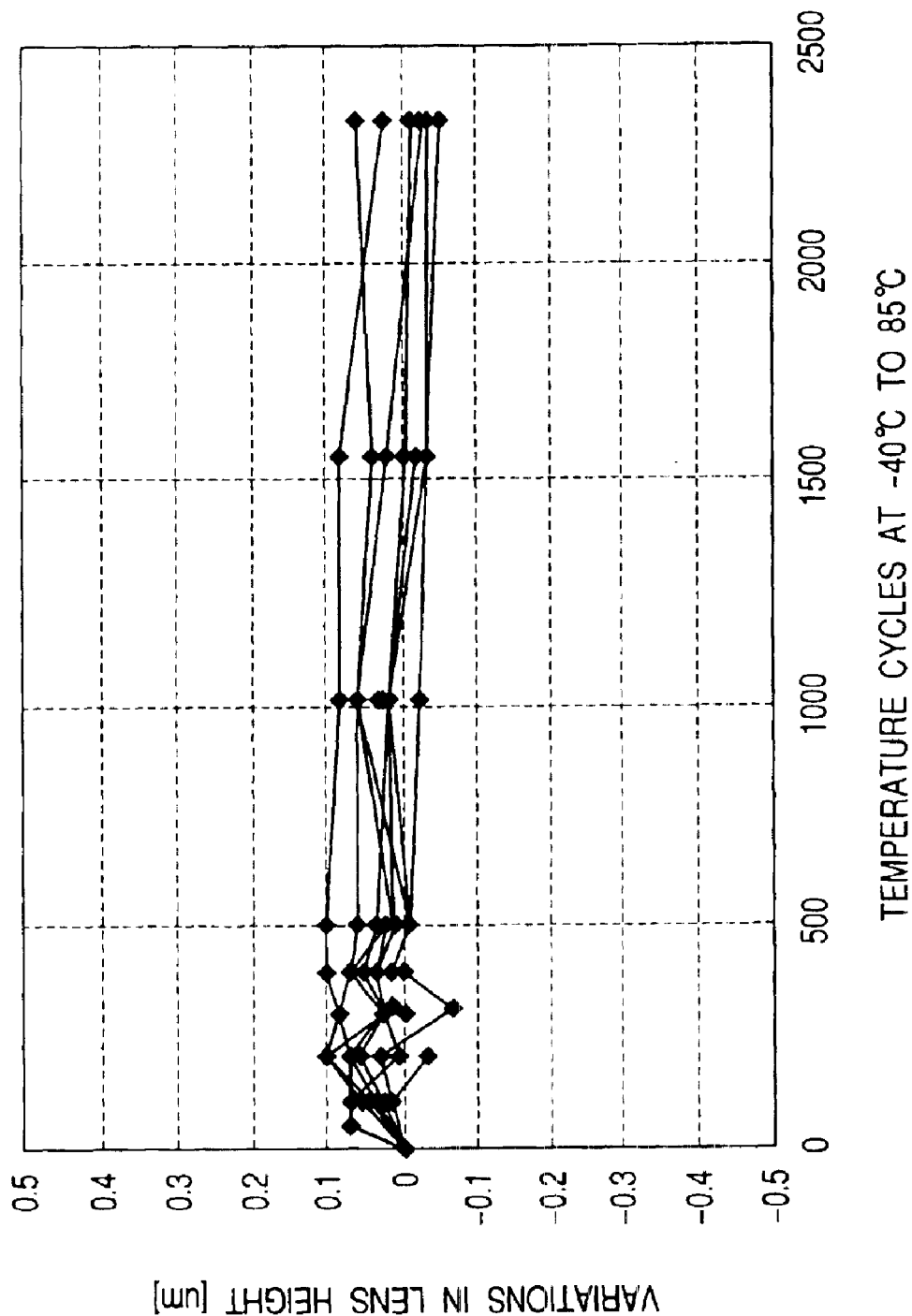
FIG. 4 is a graph illustrating positional variations of a lens in a temperature cycle test of the optical module according to the present invention.
Figure 8:
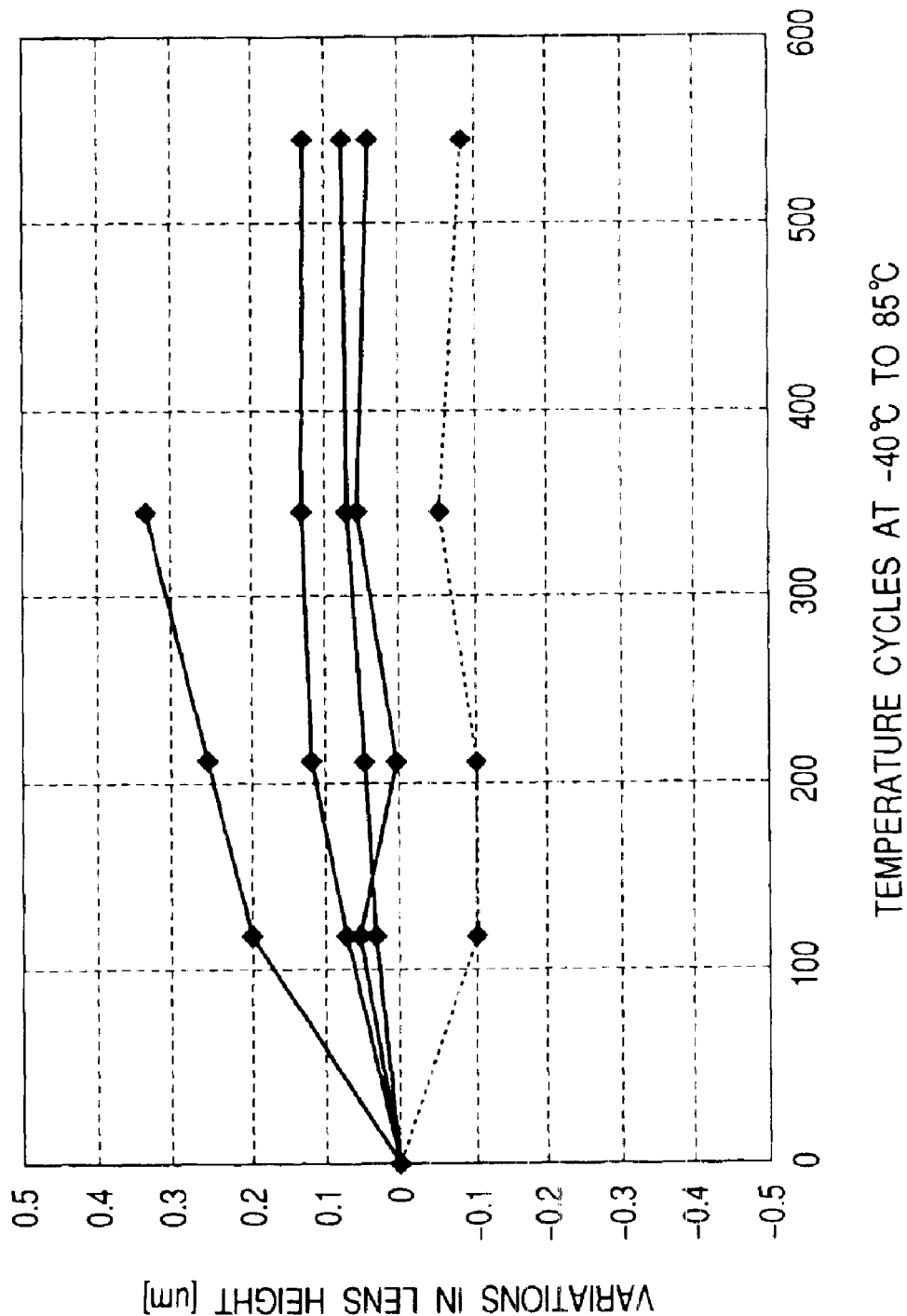
FIG. 8 is a graph illustrating positional variations of a lens in a temperature cycle test of the optical module in the comparative example.

Next, a description will be given of the test result of the reliability in temperature cycles in the optical module according to the present invention. A sample manufactured in a comparative example shown in FIGS. 6A and 6B, described later, was evaluated as comparison data in the same manner. The optical module was subjected to the temperature cycles under such a condition that it was cooled at about −40° C. for about 30 minutes and was heated at about 85° C. for about 30 minutes in one cycle. In the case where the reliability of the optical module was evaluated, variations in optical output are normally measured. However, in such an evaluation method, factors of variations in output cannot be distinguished. Therefore, the reliability of positional alignment of the lens 2 was evaluated by directly measuring variations in height of the lens 2 with respect to the silicon substrate 1 in the present embodiment. The results are shown in FIGS. 4 and 8. FIG. 4 is a graph illustrating the evaluation results of the optical module according to the present invention; in contrast, FIG. 8 is a graph illustrating the evaluation results of the optical module in the comparative example, described later. As is clear from the comparison between the respective graphs illustrated in FIGS. 4 and 8, the height of the lens was increased according to the temperature cycles in the sample in the comparative example, described later; in contrast, no variation in height of the lens appeared according to an increase in temperature cycle in the sample according to the present invention even in excess of 2000 cycles. The observation of the sample after the temperature cycle test at the connecting portion by use of a scanning type electron microscope shows that a crack generated at the connecting portion in the sample of the optical module in the comparative example; in contrast, an abnormality such as a crack was not generated at all in the optical module according to the present invention.

Figure 5B:
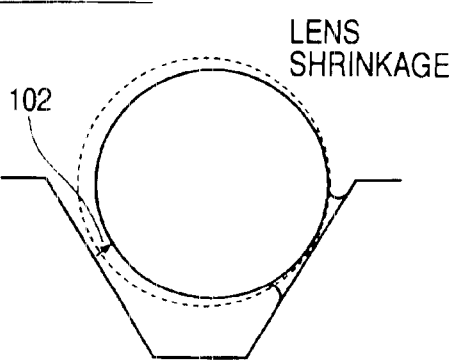

The configurations of optical systems in these optical modules are the same as each other. For example, when the lens is moved by 0.2 ìm, the variation in optical output is 0.5 dB at the maximum. That is to say, there is a sample having a variation in optical output in excess of 0.5 dB in the optical module in the comparative example. This signifies a low reliability. In contrast, in the optical module according to the present invention, the positional misalignment or detachment of the lens 2 can be prevented by avoiding the generation of a stress caused by a difference in thermal expansion coefficient between the members, as shown in the schematic views in FIGS. 5A and 5B. This signifies that it is possible to provide the optical module with a high degree of reliability without any degradation of the optical output.

Subsequently, a description will be made of the comparative example.

Figure 6A:
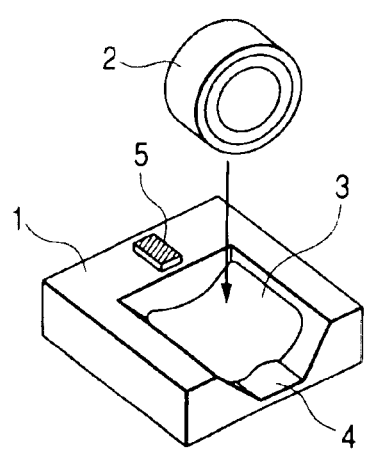
Figure 6B:
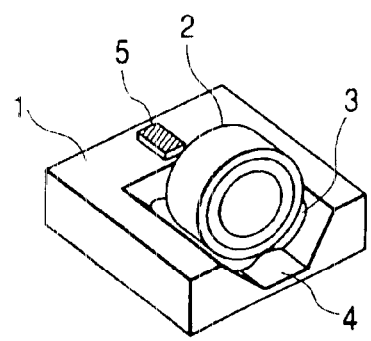

FIGS. 6A and 6B show the structure of the comparative example, in which a lens 2 is fixed in a V-shaped groove 4 formed in a silicon substrate 1 with an adhesive 3 in a great quantity. FIG. 6A shows a state before the lens 2 is put in; and FIG. 6B shows a completed state after the lens 2 has been put in. With the above-described lens fixing structure by using the adhesive 3 in a great quantity, an optical output may be degraded in the case where a temperature cycle test is carried out on an optical module. Such a mechanism will be described in reference to FIGS. 7A to 7C. This phenomenon is caused by a difference in thermal expansion coefficient between the lens 2 and the silicon substrate 1. The thermal expansion coefficient of the lens for use in optical communications is about 8 to 11 ppm/K. In contrast, the thermal expansion coefficient of the silicon substrate is 3 ppm/K. Consequently, in the case where the temperature falls lower than room temperature, as shown in FIG. 7A, the lens 2 will become smaller than the silicon substrate 1, as shown in FIG. 7B. As a result, a stress 122 acts in a direction of the normal to a V-shaped groove slope 43 at a connecting portion 121 between the V-shaped groove slope 43 of the silicon substrate 1 and the lens 2. This stress 122 acts on the adhesive 3 or an interface between the adhesive 3 and each of the component parts, thereby inducing the breakage or interfacial exfoliation 123 of the adhesive. This causes the positional misalignment or detachment 124 of the lens with anticipation of the degradation of the optical output of the optical module.

As described above and shown in FIGS. 2A and 2B, the silicon substrate 1 is secured to the Peltier cooler, stem or the like inside of the package for the optical module. For example, in the case where the silicon substrate 1 is mounted on the Peltier cooler 6, the lower layer of the silicon substrate 1 is restricted by alumina which is a material of the top plate of the Peltier cooler 6. The thermal expansion coefficient of alumina is 7 ppm/K, which also is greater than that of silicon. Therefore, alumina will become smaller than silicon as the temperature is decreased, so that silicon is warped upward, that is, force acts in a direction in which the V-shaped groove is enlarged, thereby further increasing the stress at the connecting portion between the lens and silicon.

In contrast, in the above-described preferred embodiment according to the present invention, since the adhesive 3 made of the UV curable type epoxy adhesive is applied to a portion of only the second slope 42, it is possible to prevent any positional misalignment or detachment of the lens 2 so as to achieve the optical module of high reliability without any degradation of the optical output even if the lower layer of the silicon substrate 1 is restricted by alumina as the material of the top plate of the Peltier cooler 6, and then, the silicon substrate 1 is warped upward, and therefore, the force acts in the direction in which the V-shaped groove is enlarged in the temperature cycles.

It is to be understood that the present invention is not restricted to the particular preferred embodiment given above, and that various modifications and alterations can be added thereto without departing from the scope of the present invention.

What is claimed is:

1. An optical module comprising:
   a substrate provided with a groove being formed in a surface thereof to extend from a first end of the substrate toward a second end of the substrate opposite from the first end of the substrate but not to extend to the second end of the substrate, the groove having a first slope surface crossing the surface of the substrate at an obtuse angle and a second slope surface facing to the first slope surface and crossing the surface of the substrate at an obtuse angle;
   an optical element mounted on the surface of the substrate between the second end of the substrate and an end of the groove; and
   a lens being put in the groove;
   wherein an adhesive is applied to a portion of at least the second slope surface but not to the first slope surface of the groove at all so as to fix the lens in the groove in a structure in which the lens is in contact with or in the proximity of the first slope surface and the second slope surface, and
   wherein the lens is adhered to the portion of at least the second slope surface by the adhesive while the lens is not adhered to the first slope surface at all.

2. An optical module as claimed in claim 1, wherein the adhesive is an ultraviolet ray curable type epoxy resin.

3. An optical module comprising:
   a silicon substrate provided with a V-shaped or trapezoidal groove being formed in the surface of the silicon substrate by anisotropic etching, the groove having a first slope surface and a second slope surface facing to the first slope surface and crossing the surface of the substrate at an obtuse angle;
   an optical element mounted on the surface of the silicon substrate; and
   a cylinder-shaped lens being fixed in the groove;
   wherein an adhesive is applied to a portion of at least the second slope surface but not to the first slope surface of the groove so as to adhere a side surface of the cylinder-shaped lens to the portion of at least the second slope surface in the groove in a structure in which the side surface of the cylinder-shaped lens is in contact with or in the proximity of the first slope surface and the second slope surface, and
   wherein a side of the cylinder-shaped lens is adhered to the portion of at least the second slope surface by the adhesive while the cylinder-shaped lens is not adhered to the first slope surface at all.

4. An optical module as claimed in claim 3, wherein the adhesive is an ultraviolet ray curable type epoxy resin.

5. A method for manufacturing an optical module, comprising:
   a groove forming step of forming a groove in a surface of a substrate from a first end of the substrate toward a second end of the substrate opposite from the first end of the substrate but not to extend the groove to the second end of the substrate, the groove having a first slope surface crossing the surface of the substrate at an obtuse angle and a second slope surface facing to the first slope surface and crossing the surface of the substrate at an obtuse angle;
   a optical element mounting step of mounting an optical element on the substrate having the groove formed in the groove forming step;
   a lens putting step of applying an adhesive to a portion of at least the second slope surface but not to the first slope surface of the groove formed in the groove forming step and putting the lens in the groove in such a manner as to be in contact with or in the proximity of the first slope surface and the second slope surface while any other adhesive is applied to the first slope surface; and an adhesive curing step for curing the adhesive applied in the lens putting step.

6. A method for manufacturing an optical module, comprising:

a groove forming step of forming a V-shaped or trapezoidal groove in a surface of a silicon substrate by anisotropic etching, the groove having a first slope surface and a second slope surface facing to the first slope surface;

an optical element mounting step of mounting an optical element on the surface, of the silicon substrate, having the groove formed in the groove forming step;

a cylinder-shaped lens mounting step of applying an adhesive to a portion of at least the second slope surface but not to the first slope surface of the groove formed in the groove forming step and putting the cylinder-shaped lens in the groove in such a manner as to be in contact with or in the proximity of the first slope surface and the second slope surface under the condition that any other adhesive is applied to the first slope surface; and an adhesive curing step of curing the adhesive applied in the cylinder-shaped lens putting step.

7. An optical module as claimed in claim 1, wherein the lens is cylinder-shaped, and the adhesive adheres a side surface of the cylinder of the lens to the portion of at least the second slope surface except the first slope surface.

8. An optical module as claimed in claim 1, wherein the first slope surface and the second slope surface are extended in the groove from the first end of the substrate toward the second end of the substrate but not to the second end of the substrate.

9. An optical module as claimed in claim 1, wherein the portion of at least the second slope surface is limited to an area within the second slope surface, and the lens is adhered only to the area of the second slope surface.

10. A method for manufacturing an optical module as claimed in claim 5, wherein a cylinder-shaped lens is utilized as the lens, and a side surface of the cylinder-shaped lens is adhered to the portion of at least the second slope surface except the first slope surface after the adhesive curing step.

11. A method for manufacturing an optical module as claimed in claim 6, wherein the anisotropic etching in the groove forming step is applied to a region in the surface of a silicon substrate being extended from a first end of the substrate toward a second end of the substrate opposite to the first end of the substrate so that both the first slope surface and the second slope surface are extended in the groove from the first end of the substrate toward the second end of the substrate but not to the second end of the substrate.

* * * * *